(12) United States Patent
Bonnard et al.

(10) Patent No.: US 10,183,334 B2
(45) Date of Patent: Jan. 22, 2019

(54) SELECTION SYSTEM HAVING IMPROVED AXIAL LOCKING

(71) Applicant: POCLAIN HYDRAULICS INDUSTRIE, Verberie (FR)

(72) Inventors: Loic Bonnard, Longueil-Saite-Marie (FR); Dominique Costaz, Nogent-sur-Oise (FR); Julien Viard, Compiegne (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 58 days.

(21) Appl. No.: 15/609,793

(22) Filed: May 31, 2017

(65) Prior Publication Data

US 2017/0348773 A1    Dec. 7, 2017

(30) Foreign Application Priority Data

Jun. 1, 2016 (FR) .................................... 16 54958

(51) Int. Cl.
| | |
|---|---|
| *F16K 11/00* | (2006.01) |
| *B23B 29/06* | (2006.01) |
| *B23B 5/08* | (2006.01) |
| *B23B 49/06* | (2006.01) |
| *B23Q 5/34* | (2006.01) |
| *F04B 1/047* | (2006.01) |

(Continued)

(52) U.S. Cl.
CPC ................ *B23B 29/06* (2013.01); *B23B 5/08* (2013.01); *B23B 49/06* (2013.01); *B23Q 5/34* (2013.01); *F03C 1/047* (2013.01); *F03C 1/0435* (2013.01); *F04B 1/047* (2013.01); *B23B 2260/0082* (2013.01); *B23B 2260/0482* (2013.01); *B23B 2260/12* (2013.01); *B23B 2270/025* (2013.01)

(58) Field of Classification Search
USPC ........................................................ 251/284
See application file for complete search history.

(56) References Cited

U.S. PATENT DOCUMENTS

| | | | | |
|---|---|---|---|---|
| 3,796,441 A | * | 3/1974 | Fohl | ...................... B60R 21/268 137/38 |
| 6,113,011 A | * | 9/2000 | Potz | ...................... F02M 61/08 239/453 |
| 7,275,732 B2 | * | 10/2007 | Kato | ................... F16K 31/0655 251/129.15 |

FOREIGN PATENT DOCUMENTS

| | | |
|---|---|---|
| EP | 0969205 A1 | 1/2000 |
| EP | 1058002 A2 | 12/2000 |

(Continued)

OTHER PUBLICATIONS

European Search Report dated Jan. 20, 2017, in French App. No. 1654958 (2 pages).

*Primary Examiner* — John Fox
(74) *Attorney, Agent, or Firm* — The Webb Law Firm

(57) ABSTRACT

A selection system, comprising: a sheath defining an internal housing extending in a longitudinal direction; a link rod disposed in said internal housing, and extending in the longitudinal direction; and a selection slide mounted to slide in the internal housing, about the link rod; the link rod being held stationary relative to the sheath against movement in translation in the longitudinal direction by stop means; the system being characterized in that the stop means comprise: a base that is a body of revolution and includes a conical portion; and a shell comprising two shell portions each including a conical portion configured to come to bear in plane manner against the conical portion of the base.

12 Claims, 4 Drawing Sheets

(51) Int. Cl.
*F03C 1/34* (2006.01)
*F03C 1/047* (2006.01)

(56) References Cited

FOREIGN PATENT DOCUMENTS

| | | | |
|---|---|---|---|
| EP | 2980405 | A2 | 2/2016 |
| FR | 1380823 | A | 12/1964 |
| FR | 2194893 | A1 | 3/1974 |
| WO | 2011048327 | A1 | 4/2011 |

* cited by examiner

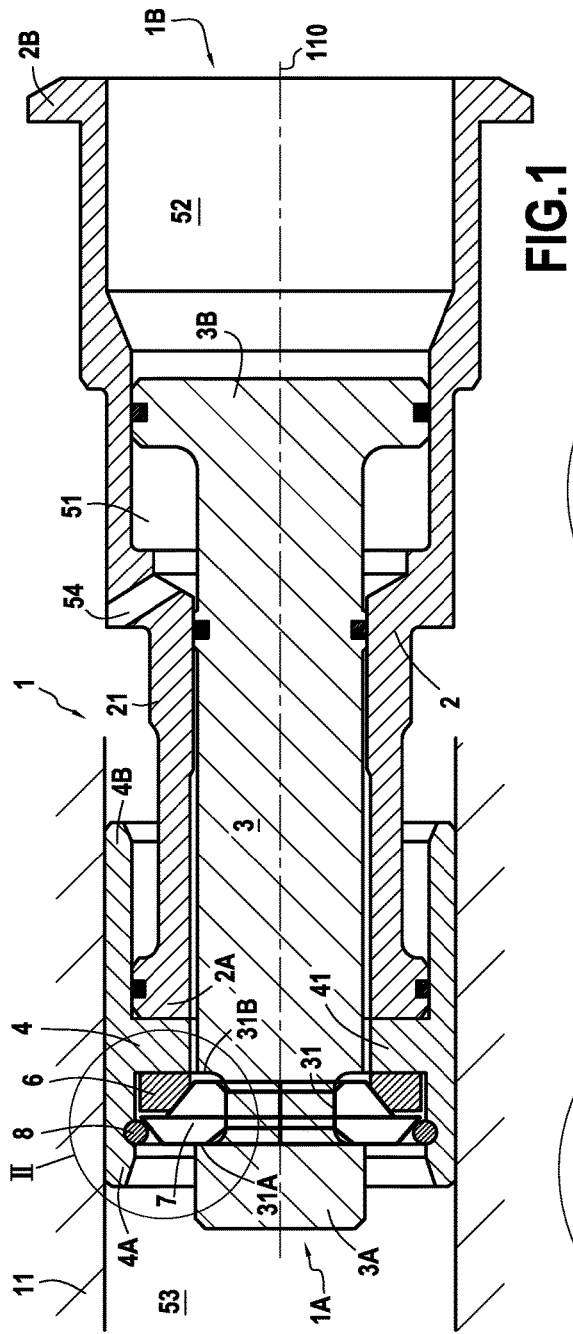

SELECTION SYSTEM HAVING IMPROVED AXIAL LOCKING

CROSS-REFERENCE TO RELATED APPLICATION

This patent application claims the benefit of priority under 35 U.S.C. § 119 to French Patent Application No. 1654958, filed on Jun. 1, 2016, the entirety of which is herein incorporated by reference.

BACKGROUND

The present invention relates to the field of hydraulic equipment, and more precisely to selection and braking slides for hydraulic equipment.

Systems for controlling hydraulic circuits make use of selection and braking slides to control the feeds to the various components of the hydraulic circuit under consideration.

In known manner, selection slides comprise an element that slides in a bore having ducts connected to pipes, in order to put the feed pipes of a piece of hydraulic equipment selectively into communication with pipes leading to the pistons of a motor.

Such selection slides make it possible to select reduced cylinder capacities of the hydraulic equipment. In particular, the slides make it possible to select or bypass reduced cylinder capacities of hydraulic machines in order to change the total active cylinder capacity of the machine. Such selection is used during driving or braking, particularly for machines having radial pistons and multi-lobe cams.

On such machines, the selection slide is placed between the distributor and the feed pipes of the machine.

In known manner, the various combinations of pistons and active lobes define reduced cylinder capacities (also referred to as elementary motors) for the hydraulic machine, which are sub-portions of the hydraulic machine, which, due to their combination of pistons and active lobes, and due to their symmetry, are individually capable of turning at constant velocity when fed at a constant rate. The reduced cylinder capacities may be defined by groups of lobes, or by groups of pistons.

Selection slides are typically stopped axially by means of circlips, cylindrical shells, or snap rings. Those various axial stop means must overcome several problems, in particular taking up high stresses in a small space, and allowing a degree of freedom between the various elements of the selection slide so as to accommodate possible offcentering of various well bearings associated with the slide.

However, known solutions all present drawbacks in response to those problems. In particular, those known solutions present the drawback that the stop parts are not stressed along their axis of greatest strength. Due to the dimensional requirements linked to mounting the stop parts and the need to segment them into several parts in order to allow them to be mounted about a shaft, said stop parts present considerable functional clearance leading to bending and concentrated forces being applied via point contacts, causing parts to break.

The present invention thus aims to address those problems at least in part.

SUMMARY

To this end, the present invention provides a selection system comprising:

a sheath defining an internal housing extending in a longitudinal direction;

a link rod disposed in said internal housing, and extending in the longitudinal direction; and a selection slide mounted to slide in the internal housing, about the link rod;

the link rod being held stationary relative to the sheath against movement in translation in the longitudinal direction by stop means; the system being characterized in that the stop means comprise:

a base that is a body of revolution and includes a conical portion; and a shell that is a body of revolution and includes a conical portion configured to come to bear in plane manner against the conical portion of the base.

The base typically forms a ring having an inside face that tapers in such a manner as to form the conical portion, the conical portion of the shell being adapted to come to bear in plane manner against said conical portion of the base.

The base typically bears against a first shoulder formed on the sheath, and the shell bears against a second shoulder formed on the link rod.

The system may thus further comprise a guide washer.

The shell thus bears against the guide washer, which itself bears against the second shoulder formed on the link rod.

Said guide washer is typically formed by a spring washer.

The guide washer is typically a spring washer configured in such a manner as to enable movement between the sheath and the link rod, in such a manner as to enable the concentricity and/or the coaxiality between the sheath and the link rod to be modified.

In an example, the shell is made up of two identical shell portions.

The two shell portions are positioned in a groove formed in the link rod, and are configured in such a manner as to define a functional clearance between the two shell portions when they are mounted about the link rod.

Said functional clearance typically lies in the range 1.5 millimeters (mm) to 2.5 mm.

In an example, each of the conical portion of the base and the conical portion of the shell forms an angle of 45° relative to the longitudinal direction of the selection system.

The invention also relates to a hydraulic machine presenting at least two operating cylinder capacities, including a selection system, as described above.

The selection system is typically in fluid flow connection firstly with feed pipes for feeding the hydraulic machine, and secondly with feed pipes for feeding pistons of the hydraulic machine, so as to enable all or part of the pistons of the hydraulic machine to be fed with fluid.

The selection system is thus typically disposed in an axial bore of said hydraulic machine, said bore including a plurality of ducts configured to be in fluid flow connection with feed pipes of the hydraulic machine for feeding subsets of pistons of the hydraulic machine.

BRIEF DESCRIPTION OF THE DRAWINGS

Other characteristics, objects, and advantages of the present disclosure appear from the following description, which is purely illustrative and nonlimiting, and which should be read with reference to the accompanying drawings, in which:

FIG. 1 is an overall view of a system in an aspect of the invention;

FIG. 2 is a detail view of the axial stop system shown in FIG. 1;

FIG. 10 is a detail view of another embodiment of a system in an aspect of the present invention.

In all of the figures, elements that are in common are identified by identical numerical references.

DETAILED DESCRIPTION OF THE DRAWINGS

With reference to FIGS. 1 to 11, there follows a description of a system in accordance with an aspect of the invention.

FIG. 1 is an overall view of a selection system 1, which is suitable for being used in particular as a cylinder capacity selector or a braking selector for a hydraulic machine.

Figure 11:
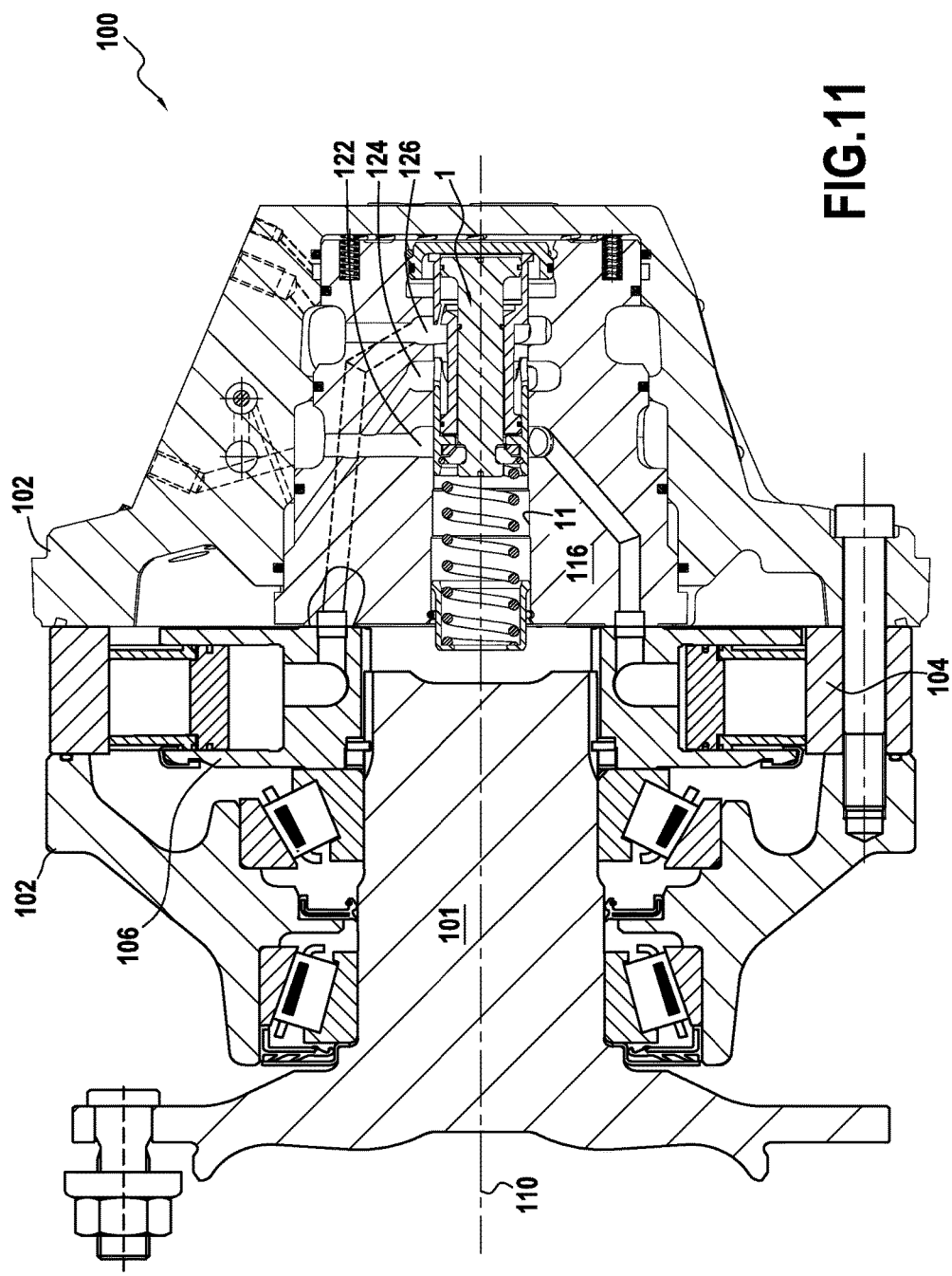
FIG. 11 is an example showing a system incorporated in a hydraulic machine in an aspect of the invention.

FIG. 11 is an example showing such a selection system 1 incorporated in a hydraulic machine.

The selection system 1 is typically disposed in an axial bore 11 made in a hydraulic machine. For illustrative purposes, FIG. 1 diagrammatically shows such an axial bore 11.

The axial bore is typically made in a distributor of a hydraulic machine, or in the body of the machine. The selection system is positioned so as to be connected hydraulically to feed orifices of the hydraulic machine and to a system for opening or closing connections from the distributor to the pistons of the hydraulic machine. Depending on the configuration of the hydraulic machine, the selection system 1 may be placed in the body of the hydraulic machine, e.g. in a lid, or in the distributor of the hydraulic machine. It may be placed longitudinally or transversely relative to an axis of rotation of the hydraulic machine. The axial bore 11 includes annular ducts (not shown), that are connected directly or indirectly to the feed pipes for feeding the hydraulic machine, and to the piston chambers of the hydraulic machine, via the distributor. These various elements are well known to the person skilled in the art, and are therefore not shown in the figures.

In the example configuration shown in FIG. 11, FIG. 11 shows a selection system in a hydraulic machine 100 of the type having radial pistons, including a shaft 101, an envelope 102, a cam 104, and a cylinder block 106 that is mounted to rotate relative to the cam 104 about an axis 110 and that includes a plurality of radial cylinders 112.

The hydraulic machine comprises an internal fluid distributor 116 that is secured to the envelope for rotation about the axis 110. In other words, the internal distributor 116 and the cam 104 do not turn relative to each other. The internal distributor 116 is housed inside the envelope 102, in a region of the envelope that may be referred to as the "distribution lid".

The internal distributor 116 includes a bore 11 in which the selection system 1 is disposed. The internal distributor 116 includes a plurality of ducts opening out radially into the bore 11, each duct being connected to a fluid feed or delivery pipe, or to a chamber of the cylinder block 106. In the example shown, the internal distributor 116 has three ducts 122, 124, and 126.

The selection system 1 also comprises a slide 2, a link rod 3, and a sheath 4. The slide 2 presents a bore 21 at its outer periphery, making it possible to make fluid flow connections, e.g. between the various pipes of a distributor of a hydraulic machine.

A proximal end 1A and a distal end 1B of the selection system 1 are defined arbitrarily, and reference may then be made to the proximal and distal ends of each component relative to the proximal end 1A and to the distal end 1B of the selection system 1.

The link rod 3 is disposed inside the slide 2, while the sheath 4 is secured to the proximal end 3A of the link rod 3 and extends back around the proximal end 2A of the slide 2.

The selection system 1 is controlled through the application of forces in a proximal chamber 53, an intermediate chamber 51, and a distal chamber 52. The control of such a selection system 1 is known, and is not described in detail herein.

These forces may be provided by means of return elements such as springs or washers, or by the application of pressure (e.g. hydraulic pressure) in the chamber under consideration.

By way of example, the proximal chamber 53 may be provided with a spring applying thrust on the assembly formed by the link rod 3 and the sheath 4, while a control pressure is applied in the distal chamber 52, and the intermediate chamber 51 is subjected to a pressure that is equal to the pressure applied in the outer duct of the slide 2, that is taken up via a tapping pipe 54. As an alternative and/or in addition, a spring may be positioned so as to exert thrust on a shoulder formed in this example at the distal end 2B of the slide 2, thus tending to move the assembly in a direction going from the proximal end towards the distal end.

The spring acts as a return spring, and places the selection slide in a default position when there is no pressure in a chamber. The positions of the slide are controlled by opposing forces between at least one of the chambers of the selection system and at least one spring.

In known manner, abutments in translation are provided on the slide 2, which abutments cooperate with the environment of the slide and of the bore 11, so as to define a stroke for the movement of the selection system 1. In known manner, the movement of the components of the selection slide put various ducts connected to the hydraulic pipes into communication. With reference to FIG. 11, the movement of the components of the selection slide 1 makes it possible to put the ducts 122, 124, and 126 of the internal distributor 116 selectively into fluid flow communication, and thus to control the cylinder capacity of the hydraulic machine 100.

These forces exerted in the chambers 51, 52, and 53 control travel of the assembly formed by the link rod 3, the sheath 4, and the slide 2, and thus control the hydraulic connections made by the slide 2 via its diameters of different values.

It should be understood that an increase in pressure in the distal chamber 52 tends to move the selection system 1 in a direction going from its distal end 1B towards its proximal end 1A, while an application of thrust by a spring disposed in the proximal chamber 53 tends to move the selection system 1 in a direction going from its proximal end 1A towards its distal end 1B.

The sheath 4 is secured to the link rod 3, via an internal collar 41 of the sheath 4, which collar is secured to the outer periphery of the link rod 3 by stop means that are described below.

The stop means are shown in detail in FIGS. 2 to 9. The stop means comprise a base 6 and a shell 7 formed by at least two shell portions. In the example shown, the shell 7 is formed by two shell portions 7A and 7B, which are identical in this embodiment.

Initially, the general shape of the shell 7 and its function are described below, and then the shell portions forming it are described.

The base 6 is a body of revolution. In the embodiment shown, the base 6 forms a ring having an outside diameter that is constant, thus forming a cylindrical outside portion 62, and comprising an inside portion having a diameter that is constant thus forming a cylindrical inside portion 63, and a portion having an inner diameter that decreases between a proximal face 6P and a distal face 6D of the base 6, thus forming a conical inside portion 61. The proximal face 6P and the distal face 6D of the base 6 are typically plane.

The shell 7 is contained within a geometrical envelope, and it forms a body of revolution.

Its proximal face 7P is plane, typically in a plane that is perpendicular to the longitudinal direction of the selection system 1 and thus perpendicular to the axis of symmetry of the shell 7.

Its distal face 7D is formed by two plane portions 7D1 and 7D2 (the portion 7D1 in this embodiment being the plane portion situated towards the outside of the shell 7, and the portion 7D2 in this embodiment being the plane portion situated towards the inside of the shell 7), which plane portions are connected together by a sloping portion 7D3.

The sloping portion 7D3 thus forms a conical portion of the shell 7, the slope of which corresponds to the slope of the conical inside portion 61 of the base 6.

Thus, by positioning the shell 7 to bear against the base 6, the sloping portion 7D3 of the shell 7 comes in a planar contact against the conical inside portion 61 of the base 6.

The conical inside portion 61 of the base 6 and the sloping portion 7D3 of the shell 7 typically form respective truncated cones of revolution that slope at an angle lying in the range 20° to 80° or in the range 30° to 60° relative to the longitudinal direction of the selection system 1, or indeed at an angle lying in the range 30° to 50° relative to the longitudinal direction of the selection system 1, or more precisely 40° or 45° relative to the longitudinal direction of the selection system 1.

In the example shown, the inner edges of the shell 7 are provided with chamfers 73 and 74, defining two sloping inside portions that are respectively proximal and distal. The proximal outer edge of the shell 7 is also provided with a chamfer 75, forming a sloping proximal outside portion. The inside face 76 of the shell 7 is cylindrical and of diameter that is constant. The chamfers 73 and 74 make it possible to ensure that the contact between the shell 7 and the duct 31 is only of the plane or cylindrical type only, and that the contact is not affected by rounded portions, e.g. at the connection between the bottom of the groove 31 and its ends 31A and 31B, the bottom of the groove 31 being the cylindrical portion of the groove 31 having the smallest diameter. The chamfers 73 and 74 thus ensure that the shell 7 bears properly on the link rod 3.

As mentioned above, the shell 7 as shown is formed by two shell portions 7A and 7B that are identical in this embodiment so as to enable the selection system 1 to be assembled, and more precisely so as to enable the shell 7 to be positioned around the link rod 3, in the groove 31. The shell portions need not be identical; the functions described below remain unchanged. Below, the structure of the shell portions 7A and 7B are described with reference to FIGS. 7 á 9. The numerical references are identical to those used above to describe the shell 7, but include the letter A or B depending on the portion of shell under consideration.

Figure 3:
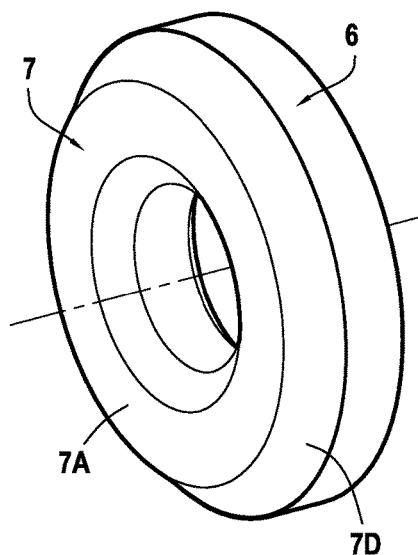
FIGS. 3 to 9 are other detail views of the axial stop system.
Figure 6:
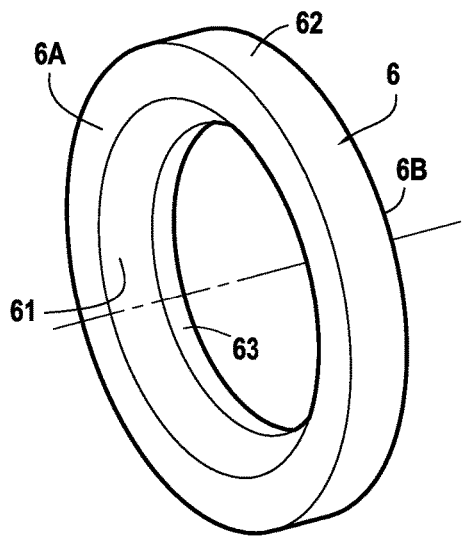
Figure 4:
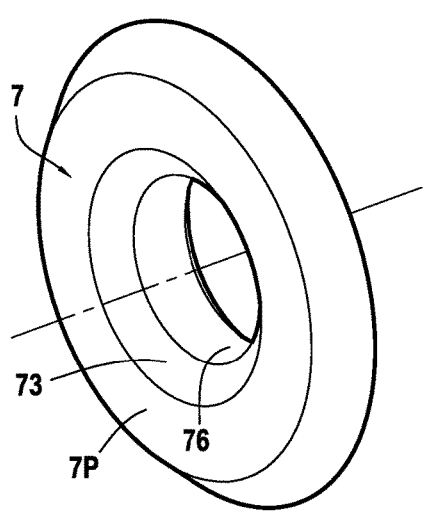
Figure 5:
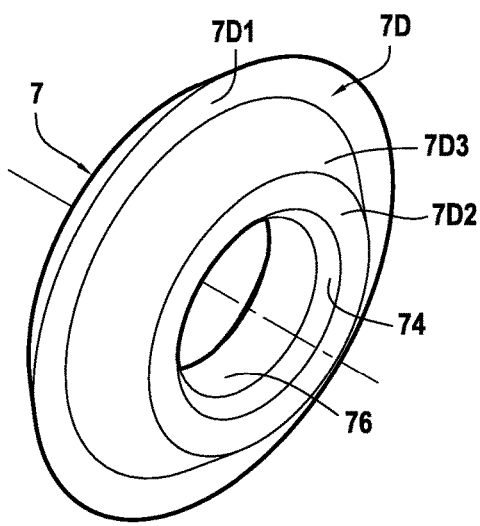
Figure 7:
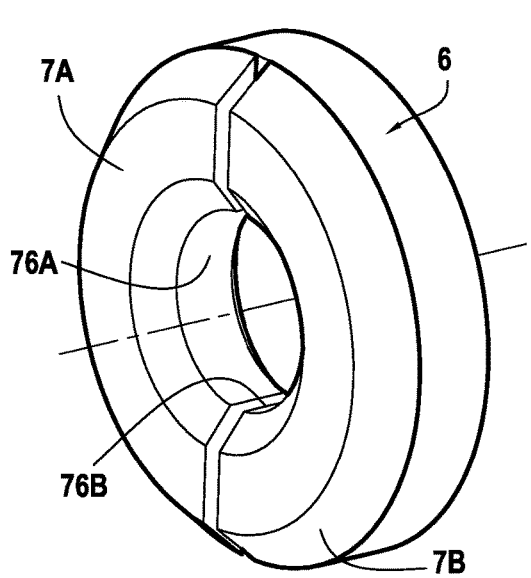

FIG. 7 is similar to above-described FIG. 3, with the shell 7 in this embodiment being formed by two shell portions 7A and 7B.

Figure 9:
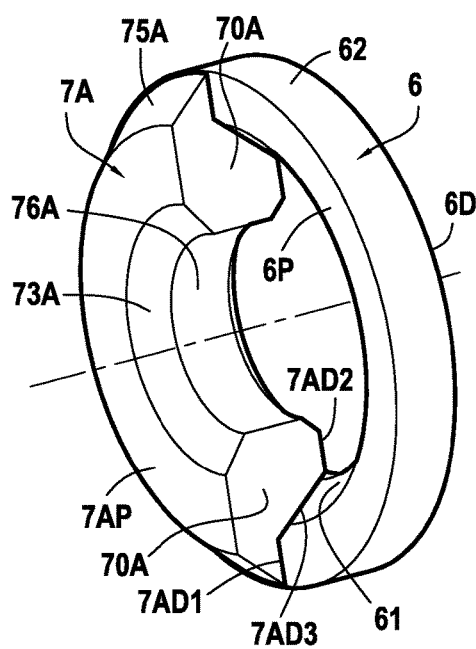

The shell portions 7A and 7B are therefore configured to come to bear in plane manner against the base 6, the bearing taking place via the sloping portions 7AD3 and 7BD3 of the shell portions 7A and 7B on the inside portion 61 of the base 6, as can be seen in FIG. 9.

Each of the two shell portions 7A and 7B presents two faces identified by the numerical reference 70 and facing the other shell portion.

In the example shown, each of the faces 70 extends radially in a plane parallel to and including the axis of revolution of the shell 7.

Figure 8:
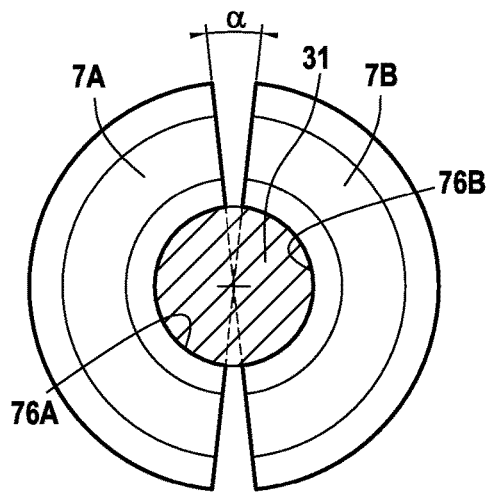

Functional clearance exists, typically of the order of 1.5 mm to 2.5 mm, or more precisely of the order of 2 mm between the two shell portions 7 when they are assembled in the assembled position in the groove 31 of the link rod 3, as shown in FIG. 8.

More precisely, when the shell portions 7A and 7B are assembled in the assembled position in the groove 31 of the link rod 3, the shell portions 7A and 7B do not extend in continuous manner around the link rod; functional clearance therefore exists between the two shell portions 7A and 7B.

Such functional clearance makes it possible to ensure that the two shell portions come to bear on the link rod 3, by applying the inside faces 76A and 76B of the shell portions 7A and 7B against the bottom of the groove 31 while applying force on the rod 3, thus making it possible to guarantee that the shell portions are perpendicular relative to the longitudinal axis of the link rod 3, and therefore to guarantee that the shell portions 7 are in alignment relative to the base 6, and also to guarantee contact between the shell portions 7A and 7B and the base 6 via the conical surface defined by the face 7AD3 and 7BD3 of the shell portions 7A and 7B.

Thus, FIG. 8 is a diagram showing the shell portions 7A and 7B assembled around the groove 31 in the link rod 3.

As can be seen in the figure, the shell portions 7A and 7B are not in contact continuously around the entire bottom of the groove 31 of the link rod 3.

In order to ensure the formation of such functional clearance, the shell portions and the groove 31 of the link rod 3 are configured so that the combined length of the inside faces 76A and 76B of the shell portions 7A and 7B is strictly less than the minimum value of the outside perimeter of the base of the groove 31, i.e. strictly less than the minimum value of the outside perimeter of the bottom of the groove 31 against which the inside faces 76A and 76B of the shell portions 7A and 7B come to bear.

In this way, the shell portions 7A and 7B do not surround the bottom of the groove 31 completely, which leads to clearance between at least two adjacent faces 70 of the shell portions 7A and 7B. The bottom of the groove 31 is therefore not in contact over its entire perimeter (or its circumference) with the inside faces 76A and 76B of the shell portions.

The functional clearance typically lies in the range 1.5 mm to 2.5 mm.

Put differently, when the shell portions are assembled around the groove 31, there exists at least one angular sector a (alpha) around the bottom of the groove 31 that is unoccupied by a shell portion. Or, there exists at least one angular sector at the bottom of the groove 31 that is not in contact with at least one of the shell portions 7A and 7B.

The shell portions 7A and 7B may be formed individually and are thus dimensioned so as to define a functional clearance as described above, or by cutting a shell having a size that initially matches the size of the groove 31, such cutting leading to removal of matter, thereby reducing the combined length of the inside faces 76 of the shell portions, and thus forming the above-mentioned functional clearance.

The shell 7 may be made up of more than two portions, e.g. 3 or 4 portions.

The stop means 6 and 7 are disposed between the link rod 3 and the sheath 4. A groove 31 is made in the link rod 3 so as to form a housing for receiving the stop means.

The shell 7 is positioned in the groove 31, and comes into abutment against one end of the groove 31, in this embodiment the proximal end 31A of the groove 31 via its plane proximal face 7P.

The cylindrical inside face 76 of the shell 7 comes into contact with a plane bottom of the groove 31.

The base 6 is mounted to bear against the shell 7, so that the sloping portion 7D3 of the shell 7 bears against the conical inside portion 61 of the base 6. The base 6 bears with its distal face 6D against the inside collar 41 of the sheath 4, so contact is therefore contact between two plane faces.

The shell 7 therefore bears in plane manner both against the link rod 3 and against the base 6, said base 6 bearing in plane manner against the shell 7 and the sheath 4. Force is therefore transmitted between the sheath 4 and the link rod 3 via plane bearing surfaces, in particular by means of the conical contact between the shell 7 and the base 6 via their sloping faces. It should be noted that the inverse configuration is also possible, the base 6 thus bearing in plane manner against the link rod 3 and the shell 7, and the shell 7 bearing in plane manner against the base 6 and the sheath 4.

This transmission of force via a plane bearing surface via faces that are sloping relative to the longitudinal direction of the selection system 1 gives rise to a force between the two elements that are sloping relative to the longitudinal direction of the selection system 1. This force therefore has an axial component and a radial component.

The radial component of the force tends to tighten the shell 7 on the link rod 3, and thus take up any clearance that might remain on the link rod 3, which makes it possible to avoid the shell 7 becoming off-centered, or not being perpendicular to the longitudinal axis of the rod 3, and avoids force being concentrated on three points. Bending stress on the shell 7 is thus removed, and the shell 7 therefore presents increased resistance to force compared with conventional stop means that give rise to point contacts while force is being applied.

In the embodiment shown, a stop ring 8 is disposed in a groove 48 made in the sheath 4. In this embodiment, the stop ring 8 comes to bear against the chamfer 75 of the shell 7, and makes it possible to retain various parts so as to facilitate assembly and transport.

FIG. 10 shows a variant of the embodiment described above with reference to FIGS. 1 to 9.

In this variant, a spring washer 9 is inserted between the base 6 and the sheath 4, more precisely between the inside collar 41 of the sheath 4 and the distal face 6D of the base 6. As explained below, the spring washer 9 has a guide function; it could also be referred to as a guide washer 9.

The spring washer 9 is typically a conical spring washer.

Due to the presence of the spring washer 9, this variant allows movement between the sheath 4 and the link rod 3, and thus makes it possible to modulate concentricity and coaxiality.

More precisely, deformation of the spring washer 9 makes a small amount of movement possible between the sheath and the link rod 3, which thus makes it possible to facilitate sliding of the link rod 3 relative to the slide 2, and in particular makes it possible to reduce the risk of sliding jamming when the selection system 1 slides in the bore 11 and the associated ducts.

It should be understood that even in the presence of such a spring washer 9, the contact between the shell 7 and the base 6 remains contact via two plane surfaces. Only the contact between the base 6 and the sheath 4 is modified.

As for the embodiment of FIG. 2, the configuration may also be inverted in this embodiment; the base 6 thus bears in plane manner against the link rod 3 and the shell 7, and the shell 7 bears in plane manner against the base 6 and against the sheath 4 by means of the spring washer 9.

The spring washer 9 may also be positioned to bear against the link rod 3 and either the base 6 or the shell 7; operation remains unchanged.

It should be understood that this embodiment may also be applied to the variant shown in FIG. 10, the spring washer 9 thus being interposed between the shell 7 and the inside collar 41 of the sheath 4. Operation is then identical to that described above.

What is claimed is:

1. A selection system, comprising:
   a sheath defining an internal housing extending in a longitudinal direction;
   a link rod disposed in said internal housing, and extending in the longitudinal direction; and
   a selection slide mounted to slide in the internal housing, about the link rod;
   the link rod being held stationary relative to the sheath against movement in translation in the longitudinal direction by stop means;
   the system being characterized in that the stop means comprise:
   a base that is a body of revolution and includes a conical portion; and
   a shell comprising two shell portions each including a conical portion configured to come to bear in plane manner against the conical portion of the base.

2. The selection system according to claim 1, wherein the base forms a ring having an inside face that tapers in such a manner as to form the conical portion, the conical portion of the shell being adapted to come to bear in plane manner against said conical portion of the base.

3. The selection system according to claim 1, wherein the base bears against a first shoulder formed on one item selected from the link rod and the sheath, and the shell bears against a second shoulder formed on the other item selected from the link rod and the sheath.

4. The selection system according to claim 1, further comprising a guide washer, and wherein the base bears against a first shoulder formed on one item selected from the link rod and the sheath, and the shell bears against the guide washer, which itself bears against a second shoulder formed on the other item selected from the link rod and the sheath.

5. The selection system according to claim 4, wherein the guide washer is a spring washer configured in such a manner as to enable movement between the sheath and the link rod, in such a manner as to enable the concentricity and/or the coaxiality between the sheath and the link rod to be modified.

6. The selection system according to claim 1, wherein the shell is made up of two shell portions.

7. The selection system according to claim 6, wherein the two shell portions are positioned in a groove formed in the link rod, and are configured in such a manner as to define a functional clearance between the two shell portions when they are mounted about the link rod.

8. The selection system according to claim 7, wherein said functional clearance lies in the range 1.5 mm to 2.5 mm.

9. The selection system according to claim 1, wherein each of the conical portion of the base and the conical portion of the shell forms an angle lying in the range 20° to 80° relative to the longitudinal direction of the selection system.

10. The hydraulic machine presenting at least two operating cylinder capacities, including a selection system according to claim 1.

11. The hydraulic machine according to claim 10, wherein the selection system is in fluid flow connection firstly with feed pipes for feeding the hydraulic machine, and secondly with feed pipes for feeding pistons of the hydraulic machine.

12. The hydraulic machine according to claim 11, wherein the selection system is disposed in an axial bore of said hydraulic machine, said bore including a plurality of ducts configured to be in fluid flow connection with feed pipes for of the hydraulic machine for feeding subsets of pistons of the hydraulic machine.

\* \* \* \* \*